United States Patent
Bernardo et al.

(10) Patent No.: US 10,035,480 B2
(45) Date of Patent: Jul. 31, 2018

(54) SYSTEM FOR ELECTRICALLY CONNECTING CABIN EQUIPMENT OF AN AIRCRAFT TO A CONTROL SYSTEM AND TO AT LEAST ONE ELECTRICAL POWER SUPPLY SOURCE OF THE AIRCRAFT

(71) Applicant: Airbus Operations SAS, Toulouse (FR)

(72) Inventors: Jean-Antoine Bernardo, Beauzelle (FR); Andre LaCroix, Pujaudran (FR)

(73) Assignee: Airbus Operations SAS, Toulouse (FR)

( * ) Notice: Subject to any disclaimer, the term of this patent is extended or adjusted under 35 U.S.C. 154(b) by 172 days.

(21) Appl. No.: 15/194,751

(22) Filed: Jun. 28, 2016

(65) Prior Publication Data

US 2017/0001583 A1   Jan. 5, 2017

(30) Foreign Application Priority Data

Jul. 1, 2015 (FR) ..................................... 15 56221

(51) Int. Cl.
*B60R 16/023* (2006.01)
*B60R 16/03* (2006.01)
(Continued)

(52) U.S. Cl.
CPC ............ *B60R 16/03* (2013.01); *B60R 16/023* (2013.01); *B64C 13/50* (2013.01); *G06F 13/24* (2013.01);
(Continued)

(58) Field of Classification Search
None
See application file for complete search history.

(56) References Cited

U.S. PATENT DOCUMENTS

2015/0045976 A1* 2/2015 Li .............................. H02J 4/00
                                                             700/295
2016/0111885 A1* 4/2016 Roques ..................... B64C 7/00
                                                             307/9.1
(Continued)

FOREIGN PATENT DOCUMENTS

| EP | 2838173 | 2/2015 |
| EP | 2945244 | 11/2015 |
| WO | 0193398 | 12/2001 |

OTHER PUBLICATIONS

French Search Report, dated May 4, 2016, priority document.

*Primary Examiner* — Jared Fureman
*Assistant Examiner* — Aqeel Bukhari
(74) *Attorney, Agent, or Firm* — Greer, Burns & Crain, Ltd.

(57) ABSTRACT

A system for electrically connecting a piece of cabin equipment of an aircraft to a control system and to at least one electrical power supply source of the aircraft. The connection system comprises a host interface module to which the control system and the at least one electrical power supply source are connected. The host interface module ensures the conversion of data signals originating from the control system and a transfer of voltages of the at least one power supply source to power supply/data signals that conform to a given protocol. An interface module integrated in the cabin equipment ensures the conversion of the power supply/data signals conforming to the given protocol to data signals for controlling at least one electrical service element of the cabin equipment and the transfer of the voltages of the at least one power supply source to the at least one electrical service element.

13 Claims, 4 Drawing Sheets

(51) Int. Cl.
  *G06F 13/24*   (2006.01)
  *B64C 13/50*   (2006.01)
  *H02J 1/10*    (2006.01)
  *H02J 3/38*    (2006.01)
  *H02J 4/00*    (2006.01)

(52) U.S. Cl.
  CPC  *H02J 1/10* (2013.01); *H02J 3/38* (2013.01); *H02J 4/00* (2013.01); *B64D 2221/00* (2013.01)

(56) References Cited

U.S. PATENT DOCUMENTS

2017/0021783 A1\* 1/2017 Siegel ..................... H02J 4/00
2017/0141717 A1\* 5/2017 Winstanley ............. H02P 29/68

\* cited by examiner

SYSTEM FOR ELECTRICALLY CONNECTING CABIN EQUIPMENT OF AN AIRCRAFT TO A CONTROL SYSTEM AND TO AT LEAST ONE ELECTRICAL POWER SUPPLY SOURCE OF THE AIRCRAFT

CROSS-REFERENCES TO RELATED APPLICATIONS

This application claims the benefit of the French patent application No. 1556221 filed on Jul. 1, 2015, the entire disclosures of which are incorporated herein by way of reference.

BACKGROUND OF THE INVENTION

The present invention relates to a system for electrically connecting cabin equipment of an aircraft to a control system and to at least one electrical power supply source of the aircraft.

The cabin of an aircraft is equipped with various cabin equipment comprising one or more electrical service elements. Such cabin equipment includes, for example, the panels surrounding the aircraft access doors, the toilets, the kitchen or kitchens (also called galleys), the baggage lockers, the signs, etc. This cabin equipment is in the form of modules that are installed in the cabin and which are electrically connected to the various control systems of the aircraft by means of suitable cables in order, on the one hand, to receive control signals from the control systems or to transmit such signals to the systems and, on the other hand, to be supplied with power by the aircraft's power supply sources.

In the present description, the term "control" relates to both an operation of monitoring a particular process as well as an operation of controlling such a process.

For example, in FIG. 1, two pieces of cabin equipment 10 and 11 forming a kitchen (galley), one piece of cabin equipment 12 composed of a panel surrounding an aircraft access door and one piece of cabin equipment 13 forming toilets are shown. Each piece of cabin equipment 10, 11, 12, 13 is connected, on the one hand, to an electrical power supply line 20 for supplying electrical power thereto, this electrical power supply line 20 being connected to one or more centralized power supply sources 30 and, on the other hand, to a decoding/encoding unit 40, 41, 421, 422, 43 in order to receive therefrom or transmit thereto control data from various control units 50, e.g., for detecting whether the or each service element of the cabin equipment in question is functioning correctly, for illuminating an emergency light, for lighting the cabin equipment in question, for transmitting audio messages, for transmitting alerts, for detecting smoke or for measuring the temperature, etc. To do this, each piece of service equipment 10, 11, 12, 13 is equipped with a connector 60, 61, 621, 622, 63, referred to in the rest of the description as an "equipment connector," and connectors 70, 71, 721, 722, 73, referred to in the rest of the description as "host connectors," are mounted on the wall 100 of the cabin. Lastly, suitable cables 80 are connected by their ends to the equipment connectors 60 and to the host connectors 70, respectively.

As may be seen in FIG. 1, the wall 100 delimits two areas: one, the aircraft side and the other, the equipment side.

In FIG. 2, an exemplary connection system according to the prior art is shown. On the cabin side, it comprises a piece of cabin equipment 200 that comprises, by way of example, the following electrical service elements: an emergency light 210, a toilet occupancy light 220, a handset for transmitting audio messages 230, a surveillance camera 240 and a remote control 250. These various service elements are connected to one or more equipment connectors 60.

It also comprises, on the aircraft side, a decoding/encoding unit 310, an electrical power supply source 320, an emergency power supply source 330 and a control unit 340 for controlling service units for passengers (videos, video games, etc.) (not shown). These various elements are connected to one or more host connectors 70.

The connectors 60, 70 allow the cabin equipment 200 and, more particularly, the remote control 250, to be connected to the control unit 340, the surveillance camera 240 to be connected to the decoding/encoding unit 310, the handset 230 to be connected to the electrical power supply source 320 and to the decoding/encoding unit 310, the toilet occupancy light 200 to be connected to the decoding/encoding unit 310 and the emergency light 210 to be connected to the emergency power supply source 330. The number of wires allowing a piece of cabin equipment 200 to be connected to the aircraft may be relatively high, e.g., of the order of 100.

Each host connector 70 placed on the walls 100 of the cabin is specific to the cabin equipment connected thereto. Moreover, the one or more connection cables used are also specific, as it is these that ensure the transfer of data to the control system 50.

Consequently, the layout of an aircraft must be considered from the moment of its conception to the extent that at the moment of its outfitting, the position of each piece of cabin equipment in the cabin must be known in relation to the one or more host connectors specific to this piece of cabin equipment. Thus, this outfitting must be conclusively fixed and any change requires a new layout to be studied. This is all the more the case if the cables are distributed along different routes in order to satisfy electromagnetic interference, safety and radius of curvature constraints. Lastly, this set of constraints complicates and slows the production and installation of the equipment.

SUMMARY OF THE INVENTION

An aim of the present invention is to provide a system for electrically connecting a piece of cabin equipment that allows the abovementioned problems to be solved.

To this end, the present invention relates to a system of this type for electrically connecting a piece of cabin equipment of an aircraft to a control system and to at least one electrical power supply source of the aircraft, wherein the connection system comprises:

a host interface module to which, on the one hand, the control system and, on the other hand, at least one of the electrical power supply sources are connected, the host interface module ensuring the conversion of the data signals originating from the control system and the transfer of the voltages from the one or more power supply sources to power supply/data signals that conform to a given protocol, the power supply/data signals being provided at the terminals of a host connector;

an interface module integrated in the cabin equipment, the equipment interface module being connected to an equipment connector and to at least one electrical service element of the cabin equipment, the equipment interface module ensuring the conversion of the power supply/data signals conforming to the given protocol that are present on the equipment connector to data signals for controlling the one or more electrical service elements of the equipment and the transfer of the voltages from the one or more power supply sources to the or to at least one of the electrical service elements, the connection system comprising a cable connected by its ends to the host and equipment connectors, thereby ensuring the connection of the host and equipment interface modules.

BRIEF DESCRIPTION OF THE DRAWINGS

The abovementioned features of the invention, as well as others, will become more clearly apparent upon reading the following description of an exemplary embodiment, the description being given with reference to the appended drawings, of which.

DETAILED DESCRIPTION OF THE PREFERRED EMBODIMENTS

Figure 1:
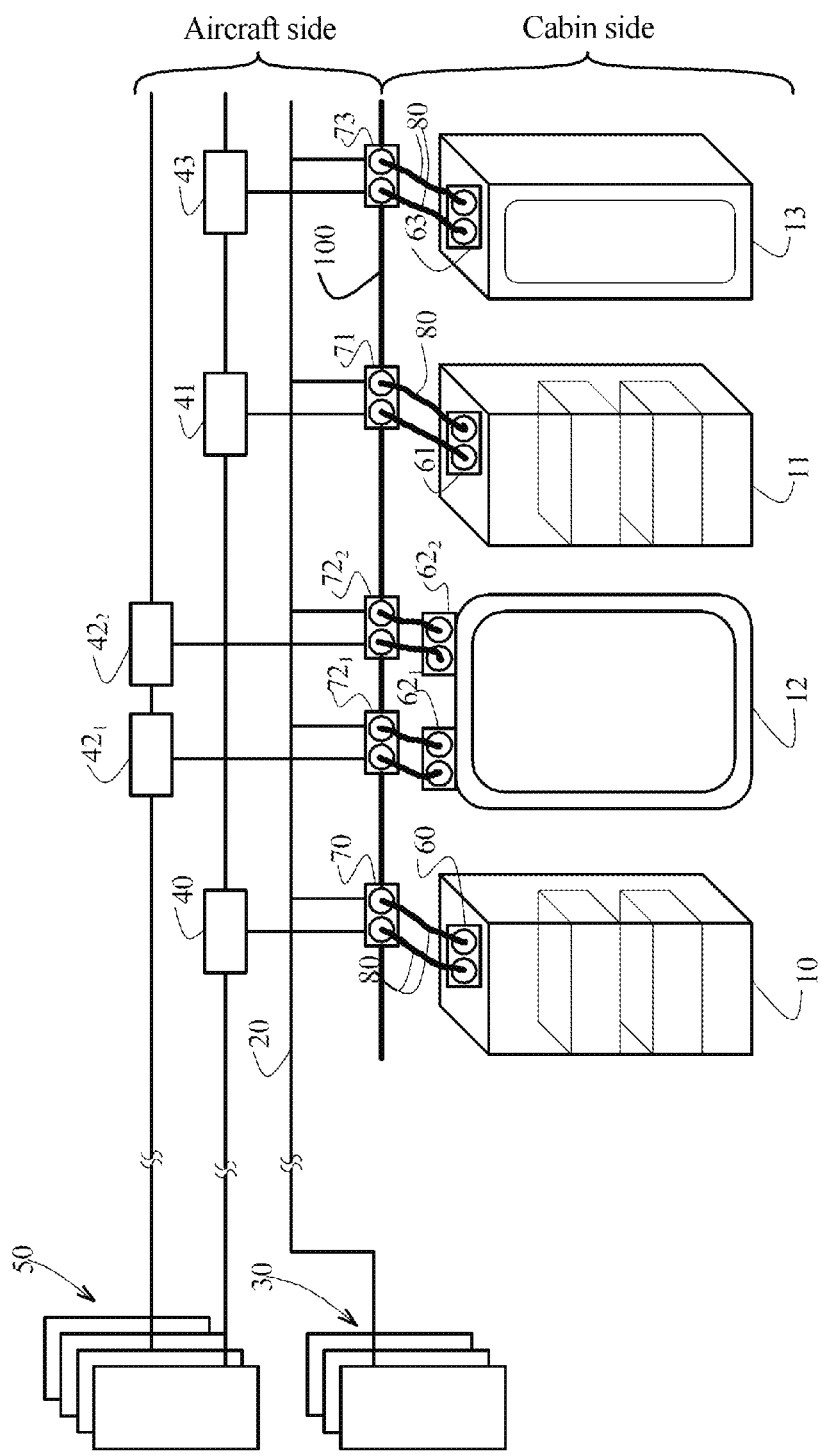
FIG. 1 is a view of a system for connecting multiple pieces of cabin equipment to an aircraft's control systems and power supply sources, according to the prior art.
Figure 2:
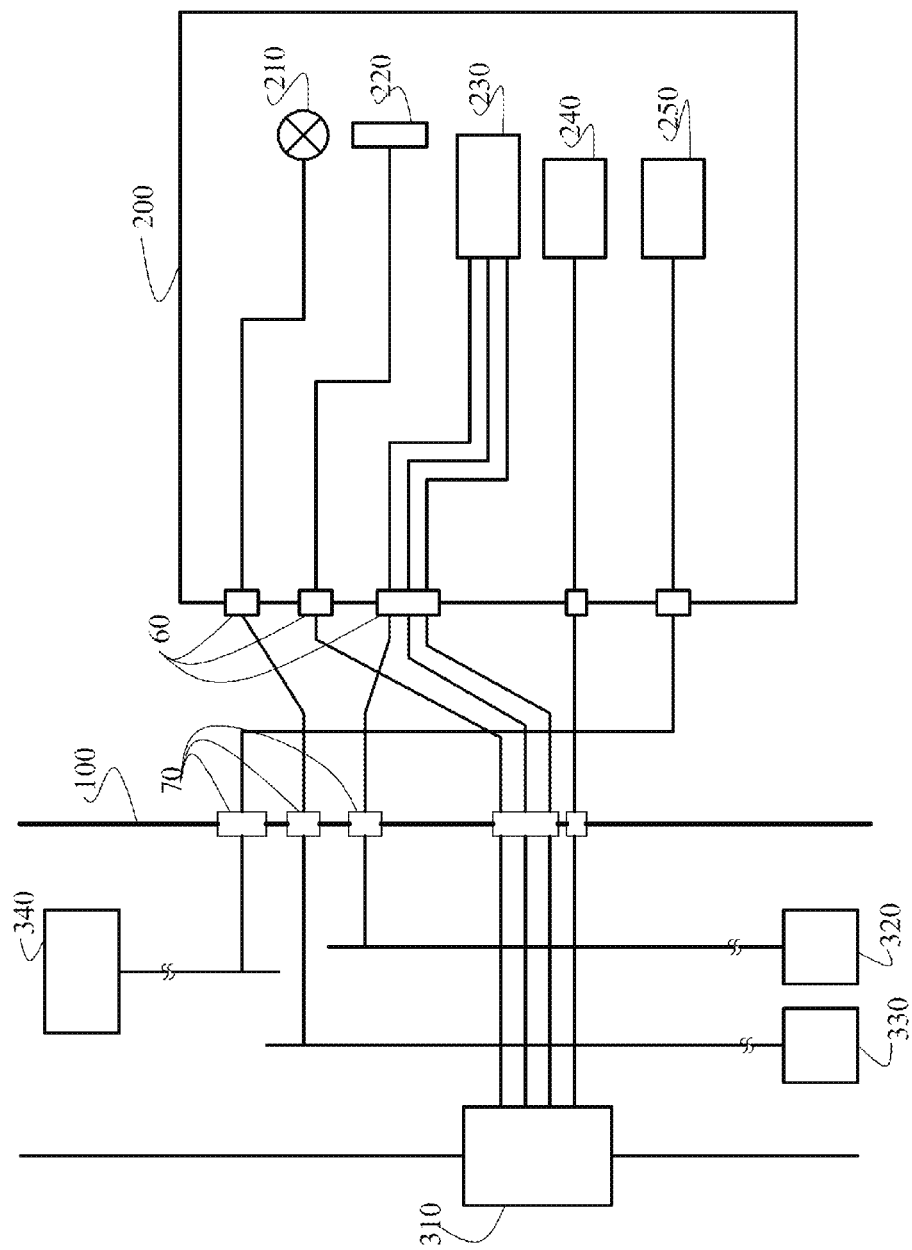
FIG. 2 is a view of a system for connecting a piece of cabin equipment to a control system of an aircraft according to the prior art.
Figure 3:
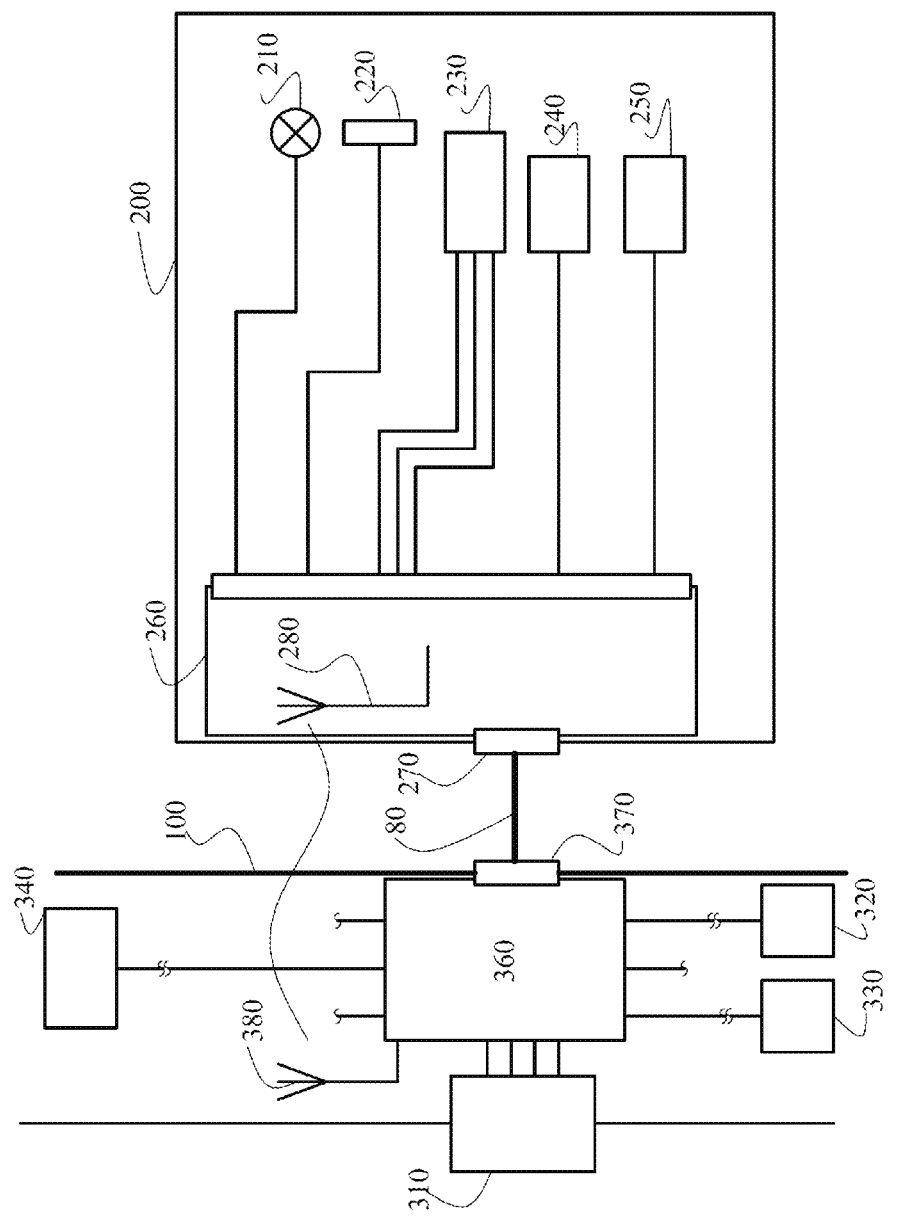
FIG. 3 is a view of a system for connecting a piece of cabin equipment to a control system of an aircraft according to a first embodiment of the invention.

To illustrate the present invention, an exemplary embodiment of a connection system according to the present invention is shown in FIG. 3. On the cabin side, it comprises a piece of cabin equipment 200 that comprises, like that shown in FIG. 2, electrical service elements such as an emergency light 210, a toilet occupancy light 220, a handset 230 for transmitting audio messages, a surveillance camera 240 and a remote control 250. According to the present invention, this cabin equipment 200 (like any cabin equipment according to the invention) is also equipped with an interface module 260, referred to as an equipment interface module, to which the electrical service elements 210 to 250 of the cabin equipment 200 are connected.

The interface module 260 is also connected to a connector 270, referred to as an equipment connector.

Still according to the present invention, on the aircraft side, the connection system comprises an interface module 360, referred to as a host interface module, to which the decoding/encoding unit 310, an electrical power supply source 320, an emergency power supply source 330 and the control unit 340 of FIG. 2 are connected.

The host interface module 360 is also connected to a connector 370, referred to as a host connector.

In the aircraft, a host interface module 360 is advantageously positioned on the wall 100 of the cabin in each area that is liable to receive a piece of cabin equipment.

The equipment interface module 260 and the host interface module 360 are connected to one another by a cable 80 that is connected to the equipment and host connectors 270 and 370.

The host interface module 360 ensures the conversion of the control data signals from the control system 50, in particular via the decoding/encoding unit 310, as well as the transfer of the electrical power supply voltage from the source 320, the power supply voltage from the emergency power supply source 330 and the digital signals from the control unit 340, to power supply/data signals that conform to a given protocol, these power supply/data signals being provided at the terminals of the host connector 370. As for the equipment interface module 260, it ensures the reverse conversion of the power supply/data signals that conform to the given protocol and which are present at the terminals of the equipment connector 270, to data signals for controlling the electrical elements of the cabin equipment 200, as well as the transfer of the power supply voltages to the electrical elements.

According to one feature of the present invention, the equipment and host interface modules 260 and 360 are universal in the sense that they are not specific to a particular piece of cabin equipment and are therefore compatible with any type of cabin equipment.

The power supply/data signals may conform to various protocols, e.g., to a protocol for carrying data over power supply lines PLC: power line communication, to a protocol for carrying supplied power over multiple lines and carrying data in series, etc.

In the first embodiment shown in FIG. 3, the structures of the host interface module 360 and the equipment interface module 260 are identical.

Figure 4:
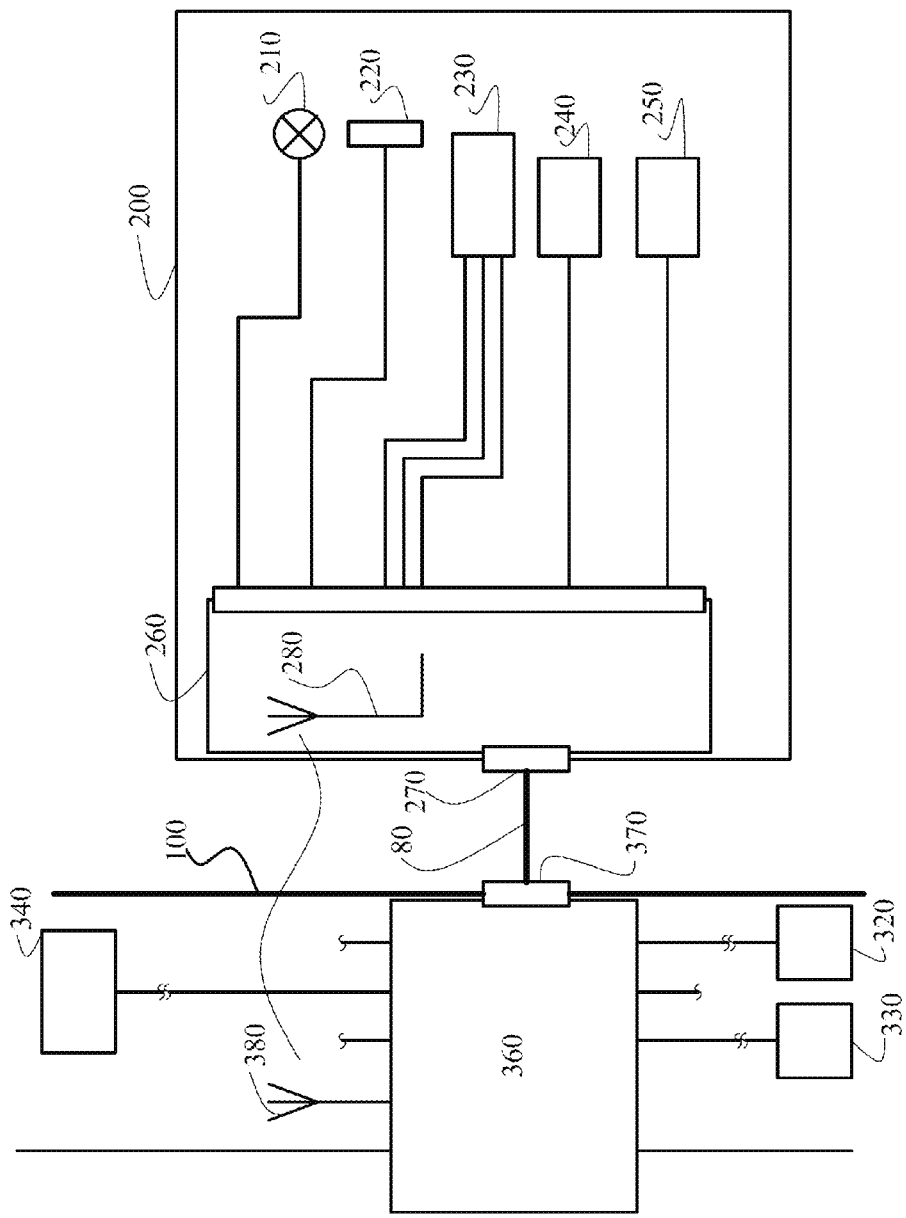
FIG. 4 is a view of a system for connecting a piece of cabin equipment to a control system of an aircraft according to a second embodiment of the invention.

In a second embodiment of the present invention shown in FIG. 4, the host interface module 360 directly ensures the conversion of the data signals from the various control systems 50 of the aircraft to power supply/data signals of a given protocol. Thus, the host interface module 360 integrates the functions of the decoding/encoding unit 310 of the preceding embodiment. In this present embodiment, the host interface module 360 is compatible with all of the signal types present on the aircraft, namely AFDX (Avionics Full Duplex), ARINC (Aeronautical Radio, Incorporated), CAN, wireless, USB and Ethernet signals, and signals over optical fiber.

In either embodiment, the host interface module 360 and the equipment interface module 260 comprise communication units 380 and 280, respectively, that form a radiofrequency communication system allowing control data signals to be exchanged between interface modules 260, 360. According to the invention, this radiofrequency communication system comes into operation when an interruption in the exchange of control data via the cable 80 occurs or during forced communication. This interruption is, for example, detected by either the host 360 or equipment 260 interface module.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for electrically connecting a piece of cabin equipment of an aircraft to a control system and to at least one electrical power supply source of the aircraft, the connection system comprising:

a host interface module to which the control system and the at least one electrical power supply source are connected, the host interface module configured to ensure a conversion of data signals originating from the control system and a transfer of voltages from the at least one power supply source to a combined power supply and data signals that conform to a given protocol, the combined power supply and data signals being provided at terminals of a host connector;

an equipment interface module integrated in the cabin equipment, the equipment interface module being connected to an equipment connector and to at least one electrical service element of the cabin equipment, the equipment interface module ensuring a conversion of the combined power supply and data signals conforming to the given protocol that are present on the equipment connector to control data signals for controlling the at least one electrical service element and a transfer of the voltages from the at least one power supply source to the at least one electrical service element, and a cable connected by its ends to the host connector and the equipment connector, thereby ensuring a connection of the host interface module and the equipment interface module for exchange of the control data signals, and the host interface module and the equipment interface module, respectively, comprising radiofrequency communication units configured to exchange control data signals with one another when at least one of the host interface module and the equipment interface module has detected an interruption in the exchange of the control data signals via the cable.

2. The connection system as claimed in claim 1, wherein the host interface module is connected to the control system via a decoding/encoding unit.

3. The connection system as claimed in claim 1, wherein the piece of cabin equipment is selected from the group consisting of: a panel around a door, a toilet, a kitchen, a baggage locker, or a sign.

4. The connection system of claim 1 further comprising: a wall disposed between the host interface module and the equipment interface module.

5. The connection system of claim 4 wherein the terminal connector is positioned on the wall.

6. The connection system of claim 1 wherein the at least one electrical service element of the cabin equipment is selected from the group consisting of: an emergency light, a toilet occupancy light, a handset, a surveillance camera, a remote control, a light, a smoke detector, and, a temperature sensor.

7. A connection system for connecting a piece of cabin equipment of an aircraft to a control system and to an electrical power supply source, the connection system comprising:

a host interface module connected to a control system and an electrical power supply source, the host interface module configured to convert data signals from the control system and transfer an electrical power supply from the electrical power supply source, the conversion and the transfer being performed so as to generate signals combining power supply and data, the host interface module comprising a host connector;

a piece of cabin equipment comprising an equipment interface module integrated in the piece of cabin equipment, the equipment interface module comprising an equipment connector and being connected to at least one electrical service element of the piece of cabin equipment, the equipment interface module converting the signals combining power supply and data into a data signal for controlling the electrical service element of the piece of cabin equipment and transferring the electrical power supply from the signals combining power supply and data to the at least one electrical service element of the piece of cabin equipment; and, a cable having a first end connected to the host connector and a second end connected to the equipment connector, wherein the electrical power supply and the data signals are both transferred from the host interface module to the equipment interface module via the cable, and wherein the host interface module and the equipment interface module each further comprise a radiofrequency communication unit, the radiofrequency communication units configured to exchange control data signals with each another when at least one of the host interface module and the equipment interface module has detected an interruption in the transfer of the data signals via the cable.

8. The connection system of claim 7, wherein the host interface module is connected to the control system via a decoding/encoding unit.

9. The connection system of claim 7, wherein the piece of cabin equipment is selected from the group consisting of: a panel around a door, a toilet, a kitchen, a baggage locker, or a sign.

10. The connection system of claim 9 wherein the at least one electrical service element of the cabin equipment is selected from the group consisting of: an emergency light, a toilet occupancy light, a handset, a surveillance camera, a remote control, a light, a smoke detector, and, a temperature sensor.

11. The connection system of claim 7 further comprising: a wall disposed between the host interface module and the equipment interface module.

12. The connection system of claim 11 wherein the terminal connector is positioned on the wall.

13. The connection system of claim 7 wherein the at least one electrical service element of the cabin equipment is selected from the group consisting of: an emergency light, a toilet occupancy light, a handset, a surveillance camera, a remote control, a light, a smoke detector, and, a temperature sensor.

* * * * *